United States Patent
Hampapur et al.

(10) Patent No.: US 7,457,433 B2
(45) Date of Patent: Nov. 25, 2008

(54) SYSTEM AND METHOD FOR ANALYZING VIDEO FROM NON-STATIC CAMERA

(75) Inventors: Arun Hampapur, Norwalk, CT (US); Sharathchandra U. Pankanti, Rego Park, NY (US); Andrew W. Senior, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 11/039,497

(22) Filed: Jan. 20, 2005

(65) Prior Publication Data
US 2006/0159308 A1 Jul. 20, 2006

(51) Int. Cl.
G06K 9/00 (2006.01)
G06K 9/32 (2006.01)
(52) U.S. Cl. .................. 382/103; 382/294; 348/E7.088
(58) Field of Classification Search ................ 382/103, 382/294; 348/E7.088
See application file for complete search history.

(56) References Cited

U.S. PATENT DOCUMENTS

| | | | | |
|---|---|---|---|---|
| 5,280,530 A | * | 1/1994 | Trew et al. | 382/103 |
| 5,285,273 A | * | 2/1994 | James et al. | 348/169 |
| 5,323,470 A | * | 6/1994 | Kara et al. | 382/103 |
| 5,341,142 A | * | 8/1994 | Reis et al. | 342/64 |
| 5,761,326 A | * | 6/1998 | Brady et al. | 382/103 |
| 5,809,161 A | * | 9/1998 | Auty et al. | 382/104 |
| 5,923,365 A | * | 7/1999 | Tamir et al. | 348/169 |
| 6,035,067 A | * | 3/2000 | Ponticos | 382/226 |
| 6,185,314 B1 | * | 2/2001 | Crabtree et al. | 382/103 |
| 6,263,088 B1 | * | 7/2001 | Crabtree et al. | 382/103 |
| 6,295,367 B1 | * | 9/2001 | Crabtree et al. | 382/103 |

* cited by examiner

Primary Examiner—Samir A Ahmed
Assistant Examiner—Stephen R Koziol
(74) Attorney, Agent, or Firm—Scully, Scott, Murphy & Presser, P.C.; Brian Verminski, Esq.

(57) ABSTRACT

A novel system and method of treating the output of moving cameras, in particular ones that enable the application of conventional "static camera" algorithms, e.g., to enable the continuous vigilance of computer surveillance technology to be applied to moving cameras that cover a wide area. According to the invention, a single camera is deployed to cover an area that might require many static cameras and a corresponding number of processing units. A novel system for processing the main video sufficiently enables long-term change detection, particularly the observation that a static object has been moved or has appeared, for instance detecting the parking and departure of vehicles in a parking lot, the arrival of trains in stations, delivery of goods, arrival and dispersal of people, or any other application.

1 Claim, 3 Drawing Sheets

SYSTEM AND METHOD FOR ANALYZING VIDEO FROM NON-STATIC CAMERA

BACKGROUND OF THE INVENTION

1. Field of the Invention

The present invention generally relates to surveillance systems and methods for providing security, and, more particularly to a novel system and process for analyzing video taken from a non-static, i.e., moving, camera.

2. Description of the Prior Art

It is expected that for some time to come, camera devices will not be of sufficiently high resolution to acquire sufficient resolution images for some tasks, e.g., surveillance, over wide fields of view. High resolution cameras are expensive, and to cover wide areas they need special lenses that distort the images. The alternative for complete coverage is using many cameras, which is also expensive. Many current surveillance systems cover wide areas with sufficient resolution by deploying pan-tilt-zoom cameras that can be directed to an area of interest within a very large field of view, and zoomed in to give sufficient detail.

Other known systems implement manual steering, with a human operator using moving cameras executing a "tour". Touring cameras allow coverage of a wide area with the penalty of not observing the whole area all the time. However, the operator may choose a particular area of interest and steer the camera, which is very labour intensive and prone to error, i.e., it is easy to miss important information, which may have dire consequences for critical surveillance operations. For simple recording, many surveillance sites use cameras that can be programmed to move in a predetermined sequence, called "touring". In this way the camera scans a wide area.

Recent years have seen increasing development of automatic systems to process and "understand" video, particularly surveillance video. Such systems are designed to "watch" the video in place of a human operator, and detect interesting events, flagging them for human intervention, or logging all activity in a database which can be searched for interesting events, or compiled into statistics at a later stage. However, these systems are all designed for use with a static camera, exploiting the static nature of the image for detecting motion as an exception, using such methods as "background subtraction" or motion analysis.

Thus, typical surveillance "analytics" systems operate on video data obtained from static or fixed cameras. Processing video from a moving camera, such as a pan-tilt-zoom camera, is much more complex as methods such as background subtraction, that form the basis of most current analytics systems, need static cameras. While known solutions implement optical flow analysis techniques for explicit detection of objects in moving cameras, these are less sensitive than static camera techniques, and moreover are computationally expensive.

It would be highly desirable to provide a system and method for automatically understanding content (e.g., moving objects) in a video from a non-static camera, particularly one that benefits from the accumulated knowledge in conventional static-camera algorithms.

SUMMARY OF THE INVENTION

It is thus an object of the present invention to provide a system and method for automatically understanding content (e.g., moving objects) of video data taken from an imaging device such as a non-static camera.

It is a further object of the present invention to provide a system and method that generates "static" video streams from the video taken from a moving camera tour that permits the application of conventional "static camera" algorithms to be applied to moving cameras that cover a wide area.

In keeping with these and other objects, there is provided a system and method for analyzing non-static camera images by determining the camera motion and using this knowledge to generate new streams of images with the motion eliminated.

Thus, according to a preferred aspect of the invention, there is provided a system and method for analyzing images acquired from a single non-static imaging device having a field of view that changes over time, the system comprising:

a means for receiving the images and processing the images to obtain at least one reference image comprising a single field of view corresponding to a portion of a larger area to be observed, the means further generating successive output images corresponding to each known at least one reference image of a field of view to form a corresponding output image sequence for each corresponding portion. The system further includes a means for analyzing each at least one output image sequence for detecting a change in a desired feature of the corresponding field of view portions.

In one embodiment, a plurality of frames from a video sequence is first composited to form a mosaic image of the observed area. Then, all successively taken video frames are additionally composited to form an output sequence of successive mosaic images. The analyzing means will then analyze each constructed mosaic of the sequence for detecting a change in a desired feature of the observed area. Changes can be detected by comparing consecutive such mosaic images (using standard techniques such as "image differencing") or by comparing multiple such mosaic images, or by constructing a model from one or more frames (a "background model") against which subsequent mosaics are compared.

In one embodiment, according to the invention, a non-static imaging device, e.g., a camera, is used to spatially and temporally sample a large field of view. The inferred motion of the camera can be used for relating the images sampled at different time and location/orientation. Subsequently, various image processing techniques are implemented to detect the moving objects. The location (and other properties) of moving objects detected in the images can be related to the location (and other properties) in the overall field of view.

Advantageously, the system and method for automatically understanding content (e.g., moving objects) in a video allowing for the application of conventional "static camera" algorithms permits the 24-hour vigilance of computer surveillance technology to be applied to moving (non-static) cameras that cover a wide area.

BRIEF DESCRIPTION OF THE DRAWINGS

Further features, aspects and advantages of the structures and methods of the present invention will become better understood with regard to the following description, appended claims, and accompanying drawings where:

DETAILED DESCRIPTION OF THE PREFERRED EMBODIMENTS

The present invention is directed to a system and method for analyzing non-static camera images by spatio-temporally relating the (known) position of the camera and the corresponding images.

Figure 1:
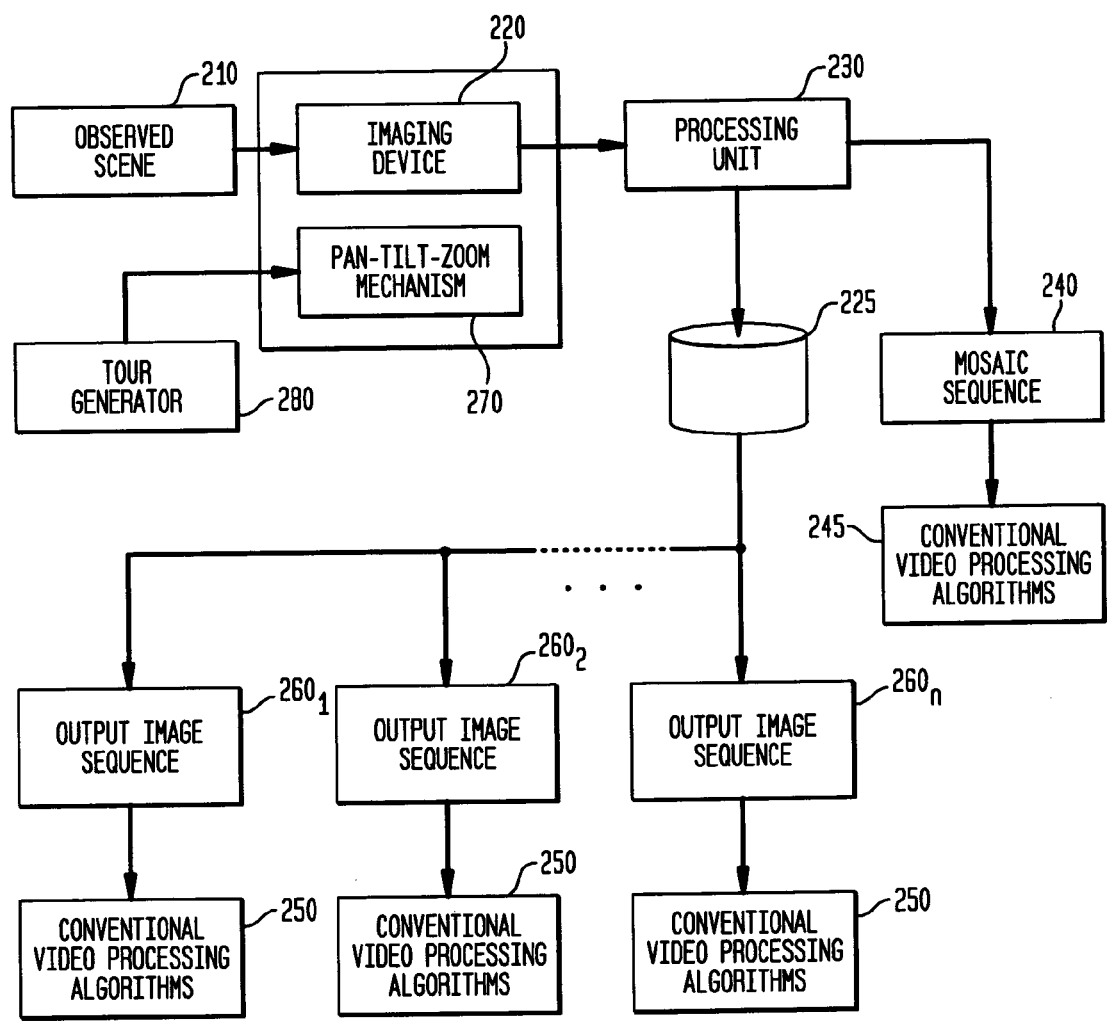
FIG. 1 depicts the multi-scale visual processing system block diagram for the static camera according to the invention.

FIG. 1 depicts the multi-scale visual processing system block diagram 200 for the static camera according to the invention. As shown in FIG. 1, the system generates video of an observed scene 210 by a single imaging device 220. For purposes of the description, it is assumed the imaging device 220 is a moving camera, implemented for taking video images of a field of view according to a programmed tour or, alternatively, manual manipulation, and employing a pan-tilt-zoom, or other motion mechanism, 270. That is, the moving camera may be steered manually or according to a tour (predetermined or generated "on the fly") as controlled by a "tour generator" device 280 (FIG. 1) whose parameters (pan, tilt, zoom, rotation, dolly, translate) may or may not be known in advance, or made available to the processing unit 230. In either embodiment, the generated video frames (80a, ...) are stored in a memory provided with a processing unit 230, such as a computer device, video camera, or like processing device provided with functionality that can interpret the frames and output select frames to generate one or more output image sequences 260(i), where i=1, 2, ..., n, for storage in the same processing unit memory or another memory storage device, e.g., video tape, removable optical disk media, hard disk drive, or database 225, shown in FIG. 1. Each output image sequence comprises a series of video frame images corresponding to when the camera has passed the same point (view), or very close to the same point, and additionally, for each image of the sequence, may include an associated time stamp. That is, in each successive tour of the imaging device, the imaging device will reach one or more reference points, albeit later in time, and the processing unit will grab the image at that point for output to the corresponding output image sequence. It is understood that the number of output image sequences that may be generated is configurable. For instance, in an example embodiment of an imaging device providing video surveillance of a parking lot (e.g., detecting empty parking spots), every 5 degree shift of camera movement, for example, will trigger capture of a new reference frame, 50a, 50b, ... and generation of a corresponding output image sequence. As will be explained in greater detail herein, in an alternative embodiment, a mosaic image sequence 240 of the input video may be generated. Subsequently, conventional video processing algorithms 250 may then be implemented to process each output image sequence $260_1$, ..., $260_n$, or, alternatively, process a series of mosaic image sequences, to detect a change on the image sequences or built mosaic for a desired application, e.g., determining car movement in a parking lot.

Thus, in the manner described in greater detail herein, at a relatively low frame rate, an apparently static video sequence is produced from a moving camera for each such reference point. These "static" video sequences, 260(i), are appropriate for the application of a wide variety of existing algorithms, 250, such as background subtraction, differencing, etc., that can result in the detection of changes, enabling various applications.

Figure 2:
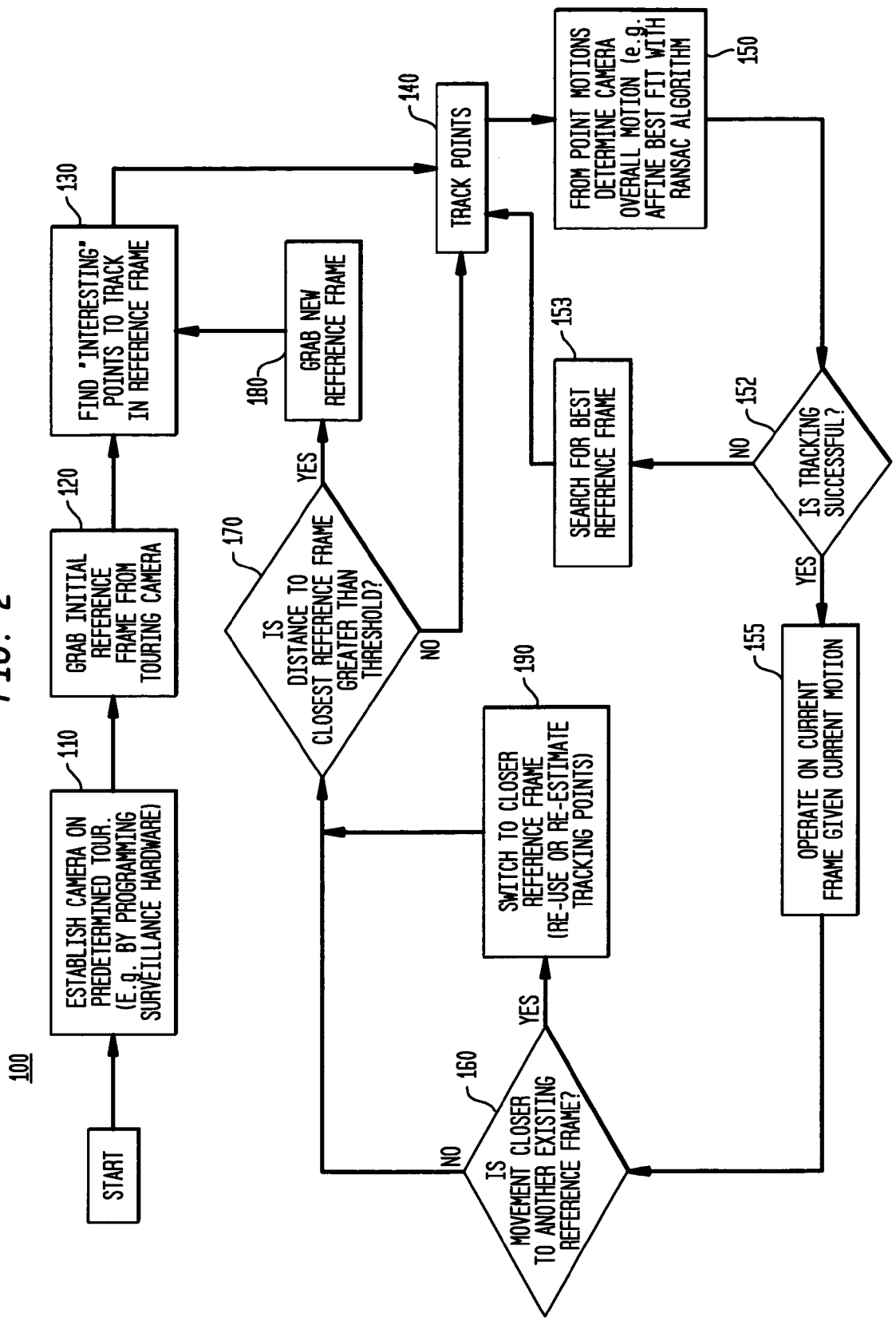
FIG. 2 depicts a process flow diagram adapted for generating and processing multiple image streams from the non-static camera according to the invention.

FIG. 2 depicts a process flow diagram 100 adapted for generating and processing multiple image streams from the non-static camera according to the invention. As shown in FIG. 2, a first step 110 provides establishing the camera on a predetermined tour, such as by programming surveillance hardware. Then, at step 120, an initial reference frame is grabbed from the touring camera. The initial or first reference image, 50a, may be arbitrary, e.g., the initial camera image view when the tour first starts. Alternatively, the image motion is tracked by the camera processing unit and an initial point (such as an extremum or mid-point of the tour) is chosen as an initial "reference frame" and the image retained. The processing unit 230 (FIG. 1) then performs steps 130, 140 and 150 as follows: As indicated at step 130, in an exemplary embodiment, "interesting" points are first found in the first reference image to be tracked in the initial reference frame. It is understood that interest operator algorithms, corner finding algorithms, and the like, may be implemented to select interesting points. It is understood that any amount of tracking points may be found in each reference frame, e.g., 20 points may be adequate for a parking lot example described herein with respect to FIGS. 3(a) and 3(b), but is dependent upon the size and speed of the algorithms used, as well as the complexity of the scene and the amount of activity therein. Continuing in the process, each of the "interesting" points is then tracked at step 140 as the camera moves, using motion tracking algorithms (for example, the well-known patch correlation or Lucas-Kanade tracking algorithms that tracks the individual points) to estimate the motion of features in the image stream. The camera motion may be well known (up to a certain accuracy) for instance if the camera is being controlled by a computer or the camera is executing a pre-programmed tour as programmed in the surveillance hardware, or is being controlled by a human where the motion control parameters are available. Motion tracking can exploit any such information and refine it to give detailed 6 degree-of freedom information about the camera motion. It is understood that, alternatively, the motion may also be constrained—e.g., to have only rotation or only translation or only zoom, and these constraints can also be exploited in determining the camera motion exactly. The camera motion may be expressed as a physical motion of the camera itself (rotation or translation), or as an apparent motion in image terms, (such as affine, similarity, translation etc).

As it is difficult to know how the camera moves, the processing will look for the tracked points in each subsequent image to track points. Then, as determined at step 150, FIG. 2, from the tracked point motions, the camera overall motion is determined. For example, an affine "best fit" using the Random Sample Consensus (RANSAC) algorithm may be used. Thus, the output of box 150 is the estimated camera motion from the tracked points. It should be understood however, that steps 130, 140 and 150 as described herein may be alternatively performed, by other algorithms besides point tracking. For example, other motion algorithms that may be employed would potentially include the tracking of features (e.g., including, but not limited to: lines, corners and other localizable image features); Direct methods; Methods using external (i.e., non-image) information (e.g., a gyroscope on the camera, or knowledge of the pan-tilt-zoom commands sent to the camera, or, a combination of any of the above.

Irrespective of the motion estimation techniques employed, as shown in FIG. 2, the process proceeds to step 155, or may optionally proceed to step 152, which determines whether tracking was successful or not (for instance by counting the number of points that were tracked, or measuring the difference between the current frame after warping and the reference frame). If tracking is not successful, a search, 153, may be carried out and the best reference frame determined, at which point tracking recommences.

After successful tracking, the system continues to step 155 which depicts frame handling options that may be applied to image frames. For each successive pass of the imaging device (including the first), as subsequent (close) frames are obtained, a variety of frame handling options may be applied at step 155. Thus, at step 155, operations are performed on the images given the current estimated overall camera motion. For example, for low frame rate, multistream images: for each change of reference frame (i) an input frame is found with smallest deviation from the reference and this frame may be warped or twisted to best fit the reference image prior to outputting this frame to the output image video stream (i). Alternatively all frames that are closer to reference frame (i) than any other reference frame may be warped to match reference frame (i) and then output in the output image sequence (i). Mosaic images sequence may be handled similarly to align frames from subsequent frames to the original mosaic as will be described.

Figure 3A:
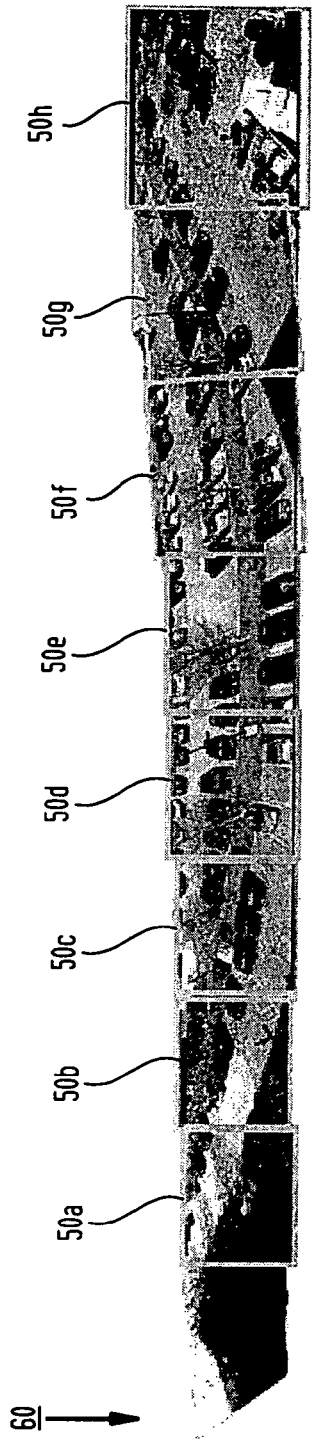
FIG. 3(*b*) depicts boxes 80*a*, . . . , 80*e*, . . . representing the images captured by a rotating camera in successive time steps as it executes a tour whose whole field of view is visualized as an image 85 and, FIG. 3(*c*) depicts the "mosaicing" of successive frame images combined into one large panorama image 75 for an example application of parking lot surveillance; and, FIG. 3(a), depicts reference frames 50a, ..., 50h that are selected from among the successive frames 80a, ..., 80e, ... grabbed from an image device tour in an example application of parking lot surveillance and shown superimposed on the mosaic of FIG. 3(c) according to an example embodiment of the invention.

As further depicted in FIG. 2, whether a frame handling step 155 is performed or not, the process proceeds to step 160, to determine which is the closest reference frame, i.e., is the current frame closer to an existing reference frame other than the current one. The process then proceeds to step 170 where a determination is made as to whether the distance to the current closest reference is greater than a threshold, e.g., greater than a predetermined amount of camera movement. A variety of distance measures can be used, including but not limited to, camera angular displacement, image translation, or rotation, determinant of transformation matrix, or any combination of such methods. Assuming small camera movement, the camera will continue to track the points by returning to step 140 where the process continues. As the loop is traversed, the touring camera will move sufficiently far from the reference frame, so the tracked points from the initial reference frame may no longer be visible, i.e., there is insufficient overlap with the original reference. Thus, at step 170, when the camera has moved a sufficient amount greater than some threshold, for example, when the area of overlap with the original reference frame is only three-quarters or one-half of the frame, or when the distortion or parallax exceeds some amount, an additional reference frame (e.g., reference frame 50b . . . ) for the new position is generated as indicated at step 180. It is understood that output image sequences of separate views with no overlap (as depicted in FIG. 3(a)) may be ideal for some applications, which may mean that an output image sequence is not generated for each reference image. When a new reference image is acquired, the process repeats by finding a whole new set of "interesting" points in that new reference image frame by the above-mentioned interest operator algorithms or corner finding algorithms. The loop processing 100 depicted in FIG. 2 continues such that every predetermined amount of camera movement above a threshold, e.g., every 5 degrees, a new reference frame will be grabbed, and each new reference frame will be the current frame. Thus, for example, in a camera motion of 29 degrees, six (6) reference image frames will be obtained. As the camera moves, the distance between the current frame and each of the (nearby) reference frames is calculated. (Distance being for instance, the number of pixels of translation to achieve alignment, or the number of degrees of rotation to achieve alignment) When the camera begins to retrace part of its path, it will get "closer" to an old (not the current) reference frame. Thus, returning to step 160, if movement is closer to another existing reference frame, the process proceeds to step 190 to effect a switch to the closer reference frame and then re-using or re-estimating (i.e. step 130) tracking points when returning to step 140. When this occurs, the closer (old) reference becomes the current reference frame and points are tracked relative to the current reference frame. When an existing reference is selected, the image may be updated based on new frames that are acquired (e.g. taking the nearest frame in each pass, with warping for small differences) and the "interesting points" may be chosen afresh. For each period that a given reference is deemed to be "current', the distance between the current frame and the current reference is monitored, and the frame with the smallest displacement is retained as the "closest" frame. This(frame is geometrically corrected to align it to the reference frame, and is output to the output image sequence. In this way, every time the camera "passes" a reference point, a single frame of video is produced, and that frame appears to come from exactly the same view point as the original reference frame.

Naturally, more than one frame can be taken from the period of time when a given reference is deemed closest, (or even when there is some overlap but another frame is closest) but frames other than the single closest frame will require more warping and have less image area in common with the reference, and a single frame per pass may be sufficient for many applications. In any event, there will generally be times when the camera has no overlap with a given reference frame, and no useful frames can be added to the "static" sequence. For regular, circular tours, one frame per pass will give a regular frame rate. Other tours (such as back-and-forth) may generate more than one frame per tour and these frames may not be generated at regular intervals. In the preferred embodiment, time stamping of the individual frames is important for any activity, as in many cases, changes in an observed scene will happen between two frames and it is important to know the time interval in which the changes happened for a particular application. Thus, in the example embodiment of determining car movement in a parking lot (FIG. 3(c)) by detecting changes on the image sequences or built mosaic, it would be possible to raise an alarm or determine the interval in which a particular car has entered or left a particular parking space. From FIG. 1, the database 225 may be searched to determine a time when a car has left a particular parking space.

Figure 3B:
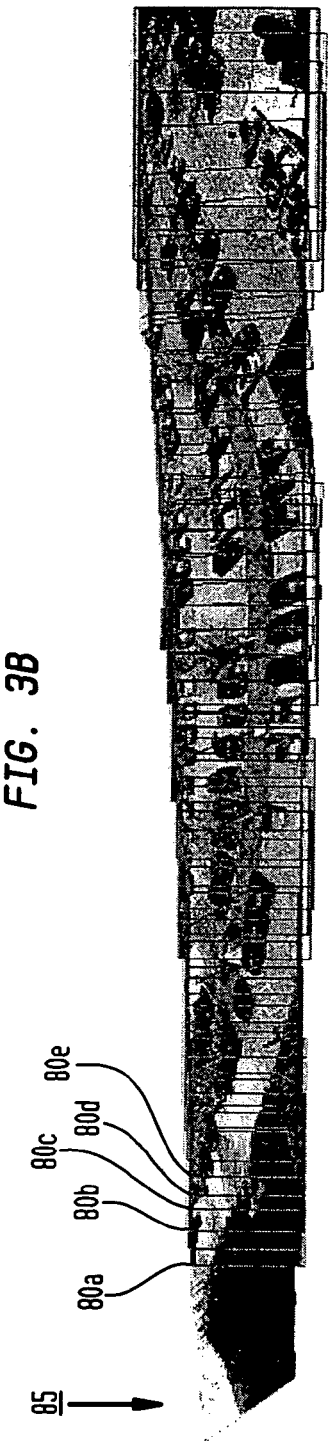
Figure 3C:
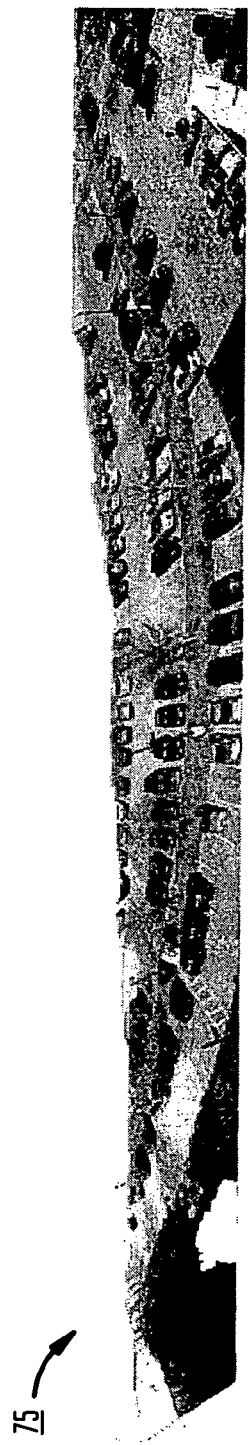

As described herein, in an alternative approach, the technique known as "mosaicing" is implemented. In an example application of parking lot surveillance, successive images 80a, . . . , 80e, . . . are grabbed from the same image device tour as shown in FIG. 3(b) and are aligned with respect to one another. In mosaicing, the information from the successive images are combined into one large image in a manner that is similar to building a panorama picture 75 as shown in FIG. 3(c), as used by digital still camera software, for instance. That is, the camera may only take only a small portion (e.g., image 80a) of an image (85) at a time. Each box 80a, . . . , 80e, . . . shown in FIG. 3(b) only corresponds to what the camera can see at any one time and each comprises a reference frame in the example depicted in FIG. 3(a). As the camera begins a tour (for instance when it is deemed to be at an extremum, or initial reference frame) a new mosaic image is begun. The mosaic images shown in FIG. 3(b) may correspond to a camera tour moving across the parking lot from the left side to the right side and grabbing an input image 80a, . . . , 80e every 30th of a second, for example. New image information from successive frames is added into a mosaic image, after aligning it to a reference mosaic constructed on an initial tour. This alignment of frames would be applied at step 155, shown in FIG. 2 prior to outputting each mosaic at the completion of a tour, as an output frame of the output "mosaic" video stream. A new mosaic is created in each such successive tour or pass, and the output of the system, 240, is a sequence of mosaics with identical views, but taken at successively later times. Referring back to FIG. 1, a conventional "static camera" processing algorithm 245, can be applied to the output of these images, which have the property that at a given image location the pixels in different mosaic images correspond to the same physical ray from the camera, sampled over time.

Irrespective of the technique implemented, as the total amount of video information output in the sequences is far less than the output of a single camera, it is easy to process all of the output streams (and do the alignment) on a single processor, so a single camera in addition to a single processor is easily able to cover a wide area.

The present invention thus implements novel methods of treating the output of moving cameras, in particular ones that enable the application of conventional "static camera" algorithms, e.g., to enable the 24-hour vigilance of computer surveillance technology to be applied to moving cameras that cover a wide area. This brings significant economic benefit because, using such software, a single non-static camera can be deployed to cover an area that might require many static cameras and a corresponding number of processing units. The limitation of the method is that a touring camera cannot see its entire field of view at any time, so the detailed tracking achieved in conventional, fixed-camera surveillance systems can not be carried out. However the processing is sufficient for long-term change detection, particularly the observation that an object has been moved or has appeared, for instance detecting the arrival and departure of vehicles in parking spaces of a parking lot; the arrival of trains in stations; the detection of arrival and departure times of vehicles, containers, people, deliveries of goods etc.; the arrival and dispersal of people; and, the detection of graffiti, litter, dumping, and damage to an observed area or structure.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for analyzing images acquired from a single non-static imaging device whose view of an observed area changes over time comprising the steps of:

establishing movement of said single non-static imaging device to acquire a sequence of single field of view static images covering a larger area to be observed, processing each acquired single field of view static image and initially determining a number of reference images frames, each reference image frame comprising a single field of view corresponding to a portion of said larger area to be observed, and, determining, for each reference image frame, one or more reference features, said one or more reference features comprising one or more of: trackable points, lines, corners, and localizable image features, or combinations thereof;

employing motion estimation for tracking, in subsequent acquired single field of view static images, said reference features that are found in a reference frame as said imaging device moves, said motion estimation for estimating imaging device movement;

obtaining, based on said estimated imaging device movement, a best reference frame corresponding to each subsequent acquired single field of view static image; and, comparing each subsequent acquired single field of view static image to a corresponding reference image frame, and geometrically correcting said frame to align said acquired single field of view static image with said reference image frame based on said tracked reference features of said estimating imaging device movement;

generating successive output images corresponding to each of said number of reference image frames of a respective field of view portion to form a corresponding output image sequence for each corresponding field of view portion, each said successive output images corresponding to each of said number of reference images of a respective field of view portion being aligned with its corresponding reference image frame; and, analyzing each corresponding output image sequence for detecting a change in a desired feature of the corresponding field of view portions over time, said method further comprising:

providing control information for generating control signals used for controlling said the non-static imaging device to control said view changes of said subsequent acquired images over time, said control information comprising one or more of pan, tilt, zoom, rotation, dolly, and translation control parameters for controlling said non-static imaging device; and, recording time stamp information taken for each at least one reference image and successive output images of said output image sequence to thereby relate a time when a detected change in a desired feature of the observed area occurred.

* * * * *